UNITED STATES PATENT OFFICE.

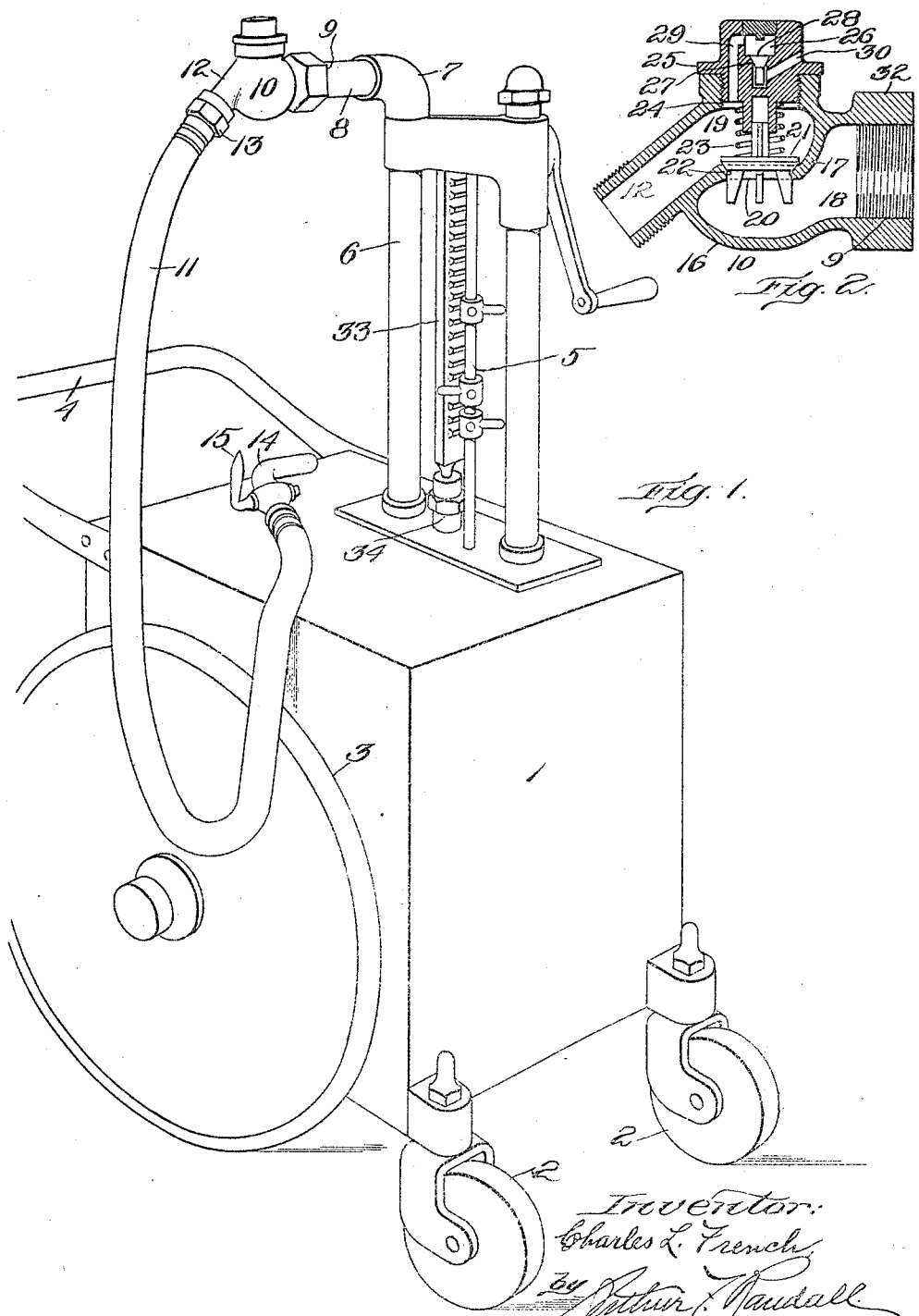

CHARLES L. FRENCH, OF CAMBRIDGE, MASSACHUSETTS; JENNIE BENNER FRENCH, ADMINISTRATRIX OF SAID CHARLES L. FRENCH, DECEASED, ASSIGNOR TO STANDARD OIL COMPANY OF NEW YORK, OF NEW YORK, N. Y., A CORPORATION OF NEW YORK.

PIPE-FITTING.

1,377,878.  Specification of Letters Patent.  Patented May 10, 1921.

Application filed October 10, 1916. Serial No. 124,829.

*To all whom it may concern:*

Be it known that I, CHARLES L. FRENCH, a citizen of the United States, residing at Cambridge, in the county of Middlesex and State of Massachusetts, have invented certain new and useful Improvements in Pipe-Fittings, of which the following is a specification.

My invention relates to a pipe fitting for storage apparatus for gasolene and the like such as is used at garages to hold a supply of gasolene and from which measured quantities may be conveniently delivered to the supply tanks of automobiles.

There are two kinds of apparatus of this sort now in common use at garages, viz., an apparatus having an underground reservoir and a portable tank apparatus, each including a measuring pump with whose outlet is connected a flexible rubber pipe provided at its discharge end with a faucet. My invention may be embodied in either type of apparatus but it is particularly adapted to portable gasolene storage tanks and for this reason I have herein illustrated my invention as incorporated in an apparatus of this type.

The regulations and requirements regarding the storage, handling and measuring of gasolene at garages and the like are very strict and are strictly enforced in order to secure the greatest degree of safety in the matter of handling and storing the fluid, and the greatest possible degree of accuracy in the matter of measuring when delivering to a customer. The use of the two kinds of gasolene storage apparatus referred to above, each of which is provided with a measuring pump and delivery hose, has been permitted by the authorities of some districts because they afforded the best known protection against fire and were more accurate in delivering proper measure than any other known device although themselves inaccurate to a marked and objectionable degree. But the authorities everywhere find fault with such apparatus and in some few districts their use has been forbidden altogether, while in other districts the authorities have indicated that certain defects therein may lead them to forbid the use thereof.

An objectionable feature to such apparatus as heretofore constructed was that when testing the pump thereof for approval and sealing, the sealer of weights and measures makes his test with the hose removed from the apparatus and if the pump measures correctly applies his seal thereto. Later on when the pump is again tested by an inspector the hose is in place and the inspector finds that the pump measures short of the correct amount and condemns it, forbidding its use until it has been adjusted so as to give correct measure and is again tested. In other words the presence of the hose affects the action of the pump causing the latter to give one measure when the hose is attached and another when the hose is removed. Furthermore, it has been found that the pump operates differently when it is connected up with hose of different lengths and because of this fact trouble and inconvenience results when a garage owner removes a worn out hose and substitutes a new one of different length.

There are other objectionable features to portable gasolene storage apparatus as heretofore constructed among which may be mentioned the following:

Very frequently the operator, after pumping a measured quantity of gasolene into a car, merely closes the faucet at the end of the rubber hose and hangs the faucet end thereof on the usual elevated hook with which the portable tank apparatus is provided. This has resulted in a portion of the gasolene that was forced into the rubber hose by the last stroke of the pump remaining in said hose and injuriously acting upon the interior of the latter so as to materially shorten the life thereof. This body of gasolene which remained in the hose was also a source of danger because sometimes the free end of the hose is thrown or dropped onto the floor with the result that the faucet is opened more or less. Heretofore, when this happened the gasolene within the hose flowed out onto the floor which was wasteful of gasolene and dangerous. Sometimes, also, the gasolene thus escaping onto the floor from the hose has caused practically the entire contents of the tank to be siphoned out onto the floor. It is also true that when supplying gasolene to a low car the body of gasolene delivered into the hose by the last stroke of the pump would sometimes automatically start a siphon in operation which would overflow the tank, drip down onto the hot muffler or exhaust pipe of the car and become ignited. This has been the cause of many serious fires. Many fires have also been caused by removing the faucet from the tank of the car without first closing said faucet and while such a siphon was in operation.

Purchasers of gasolene from apparatus of this sort have also complained of the fact that a garage patron can drain the hose at the completion of the pumping operation to the disadvantage and loss in measure of the next purchaser if the latter does not also drain the hose at the completion of the pumping operation, and of the fact that a dishonest garage owner can drain out for himself the contents of the hose after filling each tank thus giving each purchaser short measure.

The measuring pump forming part of an apparatus of this sort as heretofore constructed varied in its action according to the length of hose used and this was in part due to the tendency of the apparatus to automatically siphon from the tank while the pump was being operated, the weight of the falling gasolene within the rubber hose being greater with a long hose than with a shorter one.

The object of my invention is to provide an improved pipe fitting for gasolene storage apparatus the use of which will obviate the objections pointed out above and render said apparatus accurate in delivering measured quantities of gasolene and safer to use than apparatus of this sort as heretofore constructed.

To these ends my invention consists of a pipe fitting for gasolene storage apparatus having the peculiar features of construction and mode of operation set forth in the following description and particularly pointed out and defined in the claims at the close thereof.

In the accompanying drawings:

Figure 1 is a perspective view of a portable gasolene storage apparatus equipped with my new pipe fitting.

Fig. 2 is a longitudinal sectional view of the pipe fitting.

In the accompanying drawings I have shown my new pipe fitting applied to a gasolene storage apparatus comprising a tank 1 for holding a supply of gasolene, said tank being mounted upon casters 2 and wheels 3, and provided with a handle 4 by means of which it can be shifted about conveniently. Mounted upon the tank 1 is a measuring pump 5 with whose outlet is connected an upright pipe 6 provided at its upper end with an elbow 7 which connects said upper end with one end of a short horizontal pipe 8.

The outer end of the short horizontal pipe 8 is connected with the inlet port 9, Fig. 2, of a pipe fitting 10 having an outlet port 12 connected with a flexible rubber hose 11. The free end of the hose 11 is provided with a faucet 14 having a handle 15 by means of which it is opened and closed.

The valve fitting 10 comprises a body 16 interiorly divided by a partition 17 so as to provide an inlet chamber 18 and an outlet chamber 19, the former communicating with the inlet 9 and the latter with the outlet 12. This partition 17 is made with a port 20 therethrough that is controlled by a check valve 21 normally held on a seat 22 by a light spring 23. The upper portion of the body 16 is made with an interiorly threaded opening 24 into which is tightly screwed a cap 25 formed with a valve chamber 26 within which is provided a seat 27 for a check valve 28. The portion of the chamber 26 above check valve 28 is connected by a port 29 with the outlet chamber 19 while the portion of the chamber 26 below check valve 28 in connected with the outside atmosphere by a port 30.

The outlet 12 of fitting 16 is a downwardly oblique nozzle that is exteriorly threaded at its end, as shown at 31, to engage with the coupling 13, while the inlet 9 is interiorly threaded as at 32 to engage with the threaded end of pipe 8.

When the pump 5 is operated the gasolene forced up through the pipe 6 lifts the main check valve 21 and passes through port 20 and outlet 12 into and through hose 11, discharging from the latter through faucet 14. During the forcing stroke of pump 5 the check valve 28 remains on its seat so that the gasolene passing through the fitting 10 cannot escape through ports 29 and 30. As soon as the forcing stroke of the pump 5 ends the main valve 21 closes onto seat 22 and the body of gasolene within the hose 11 continues to fall down through the hose 11 until the hose is empty or until the next forcing stroke of the pump commences, the check valve 28 being lifted from its seat by the air which flows from the outside through ports 30 and 29 into outlet chamber 19 to occupy the space vacated by the gasolene as it falls down through the hose 11. When the next forcing stroke of the pump is made the latter is not, as heretofore, opposed by the inertia of a stationary body of gasolene within hose 11 and it will also be clear that the vent 29—30 prevents any siphoning action whatever when the pump is stopped and during the time between pump strokes. In other words the movement of the body of gasolene within hose 11 is continuous and uninterrupted so long as the pump is in operation and only ceases when the hose is emptied, while at the same time the tendency to automatically siphon from tank 1 which has characterized apparatus of this sort as heretofore constructed, is wholly eliminated.

The valve-controlled vent 29—30 serves two purposes, viz., to prevent gasolene remaining in the hose after the completion of the pumping operation and to prevent siphoning effects, but a feature of my invention also consists in providing the main check valve 21 with a spring 23 whose strength and pressure on the valve 21 is peculiarly proportioned with relation to the size and capacity of the hose 11. That is, the spring 23 exerts a pressure on the valve 21 sufficient to close said valve onto its seat against the weight of the contents of hose 11 when the latter is full, or substantially so and the pump is not making its forcing stroke. Of course the vent 29—30 offers some resistance to the entrance of the air which occupies the space vacated by the falling gasolene within hose 11 and without the spring pressed valve 21 the tendency to siphon from the pump would not be wholly eliminated. Also the spring 23 is preferably made of sufficient strength to prevent siphoning from the tank and pump should vent 29—30 become clogged or should valve 28, for any reason, fail to perform its functions properly. Sometimes, also, a metallic hose is used in place of the rubber hose 11 in which case it is not injurious thereto for a body of gasolene to remain in the same after the pumping operations so that the vent 29—30 and valve 28 may be omitted. The combination of the vent 29—30 and spring pressed valve 28, however, has the important effect of causing the pump to measure correctly under all conditions and this is due to the fact that jointly they make siphoning impossible under all conditions and prevent the inertia of the body of gasolene within the hose 11 from opposing the pump at the start of each stroke. Also the conduit leading from the tank to the hose is maintained normally closed thus preventing the escape of fumes.

It will thus be clear that the pipe fitting 10 which is of simple and inexpensive construction and capable of being applied to apparatus already in use, obviates entirely the objections pointed out above.

A feature of the construction described consists in having the threaded portion of the outlet 12 obliquely disposed with relation to the axis of the threaded portion 32 into which the end of pipe 8 screws. When the apparatus is in use the hose 11 is stretched outwardly and downwardly away from pipe 8 and oftentimes it is subjected to great strains by persons pulling thereon. Heretofore the axis of the threaded portion has been vertically disposed with the result that the hose was bent sharply at right angles near coupling 13 and soon broke through at this point. Through the oblique arrangement of the threaded portion of outlet 12 this is prevented.

The outwardly and downwardly oblique outlet 12 of the pipe fitting 10 to which the hose is coupled is also an important feature of my invention for the reason that it permits of a shorter pipe 6 being used. The reason for this is that with a perpendicular outlet it was necessary to arrange said outlet at a higher elevation than with the oblique outlet in order to prevent the hose being folded too sharply at its junction with said outlet when stretched out sidewise to reach a more or less distant delivery point.

The advantages which flow from the use of a short pipe 6 are that the piston rod 33 does not require to be packed so tightly at the stuffing box 34 as has heretofore been necessary because of the reduction of the head of the gasolene standing in pipe 6; leaking at the stuffing box 34 is obviated, and the pump works easier than when the piston rod is tightly packed. With the old construction of portable tank where the outlet corresponding to the outlet 12 of my fitting extended straight downward it was necessary to carry the pipe 6 up to a point higher than is necessary with my fitting in order to prevent the hose from being bent too sharply near the coupling 13 and in order that the hose would drain into the car. But even with the pipe 6 extending upwardly to a considerable height the downwardly pointed outlet would cause a sagging loop to be formed in the hose which would trap and hold gasolene so that the hose would not drain into the car. With the obliquely disposed outlet described there is very much less opportunity for such a loop to be formed.

What I claim is:

1. A fitting of the character described comprising a body interiorly divided by a partition to provide an outlet chamber and an inlet chamber; an inlet port for the inlet chamber adapted to be connected with a supply of liquid; an outlet port for the outlet chamber; screw threads on the body adjacent said outlet port for use in connecting the latter with a delivery hose; a port through said partition; a check valve controlling said port, said valve closing toward said inlet chamber; a spring for holding said valve closed against the valve lifting effects of the weight of the liquid falling through the hose; an opening in the wall of the body opposite said check valve through which said valve is placed within said body; a cap plug closing said opening and serving as an abutment for one end of said spring, said cap plug being formed with a valve chamber and two vent conduits, one connecting said valve chamber with the outlet chamber and the other connecting said valve chamber with the atmosphere, and a check valve within said valve chamber controlling the vent conduit leading from said valve chamber to the atmosphere, said check valve closing toward the inner end of said last mentioned conduit.

2. The above described pipe fitting for gasolene storage apparatus comprising a hollow body interiorly divided by a partition so as to provide an inlet chamber and an outlet chamber; a port extending through said partition; means whereby to connect the inlet chamber with a pipe; an outlet port connecting with the outlet chamber and terminating in a nozzle adapted to have the end of a hose or the like fastened thereto; a check valve for controlling the port in the partition, said check valve opening toward the outlet chamber, an air vent communicating at one end with said outlet chamber and providing for uninterrupted flow of gasolene away from said chamber and an inwardly opening check valve controlling said air vent, said air vent and its check valve being wholly independent of said first mentioned check valve.

In testimony whereof I have affixed my signature.

CHARLES L. FRENCH.